US010011519B2

(12) United States Patent
Himei et al.

(10) Patent No.: US 10,011,519 B2
(45) Date of Patent: Jul. 3, 2018

(54) BISMUTH-BASED GLASS COMPOSITION, POWDER MATERIAL, AND POWDER MATERIAL PASTE

(71) Applicant: NIPPON ELECTRIC GLASS CO., LTD., Shiga (JP)

(72) Inventors: Kumiko Himei, Shiga (JP); Kunihiko Kano, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/910,725

(22) PCT Filed: Jul. 31, 2014

(86) PCT No.: PCT/JP2014/070200
§ 371 (c)(1),
(2) Date: Feb. 8, 2016

(87) PCT Pub. No.: WO2015/019935
PCT Pub. Date: Feb. 12, 2015

(65) Prior Publication Data
US 2016/0185650 A1 Jun. 30, 2016

(30) Foreign Application Priority Data
Aug. 9, 2013 (JP) .................................. 2013-165757

(51) Int. Cl.
| | |
|---|---|
| C03C 8/02 | (2006.01) |
| C03C 8/16 | (2006.01) |
| C03C 8/24 | (2006.01) |
| C03C 3/062 | (2006.01) |
| C03C 3/066 | (2006.01) |
| C23C 24/10 | (2006.01) |
| C03C 3/064 | (2006.01) |
| C03C 8/14 | (2006.01) |
| C03C 10/00 | (2006.01) |

(52) U.S. Cl.
CPC .............. *C03C 3/066* (2013.01); *C03C 3/064* (2013.01); *C03C 8/02* (2013.01); *C03C 8/14* (2013.01); *C03C 10/00* (2013.01); *C23C 24/10* (2013.01)

(58) Field of Classification Search
CPC .... C03C 8/02; C03C 8/04; C03C 8/24; C03C 3/062; C03C 3/064; C03C 3/066
See application file for complete search history.

(56) References Cited

U.S. PATENT DOCUMENTS

| | | | | |
|---|---|---|---|---|
| 4,554,258 A | | 11/1985 | Francel | |
| 5,578,533 A | * | 11/1996 | Manabe | .................... C03C 8/14 501/17 |
| 5,643,636 A | * | 7/1997 | Usui | ......................... C03C 8/14 427/376.2 |
| 6,171,987 B1 | | 1/2001 | Hormadaly | |
| 6,624,104 B2 | * | 9/2003 | Sakoske | .................. C03C 3/062 501/14 |
| 7,161,117 B2 | * | 1/2007 | Minowa | ..................... C03C 8/02 106/1.19 |
| 2002/0004443 A1 | * | 1/2002 | Sakoske | .................. C03C 3/062 501/73 |
| 2003/0119647 A1 | | 6/2003 | Sanichi et al. | |
| 2006/0172876 A1 | | 8/2006 | Emlemdi | |
| 2008/0185962 A1 | | 8/2008 | Kato et al. | |
| 2008/0191334 A1 | | 8/2008 | Lee et al. | |
| 2009/0136763 A1 | * | 5/2009 | Lim | ......................... C03C 4/16 428/426 |
| 2009/0301554 A1 | * | 12/2009 | Konno | .................... C03C 3/064 136/252 |
| 2011/0015053 A1 | | 1/2011 | Hamada et al. | |

FOREIGN PATENT DOCUMENTS

| | | | |
|---|---|---|---|
| JP | 58-64245 | | 4/1983 |
| JP | 61-14151 | | 1/1986 |
| JP | 06234547 | * | 8/1994 |
| JP | 2000-072535 | | 3/2000 |
| JP | 2000302480 | * | 10/2000 |
| JP | 2002-20140 | | 1/2002 |
| JP | 2005-170753 | | 6/2005 |
| JP | 2005-525286 | | 8/2005 |
| JP | 2005-525287 | | 8/2005 |
| JP | 2007-63105 | | 3/2007 |
| JP | 2008-30994 | | 2/2008 |
| JP | 2008-189532 | | 8/2008 |
| JP | 2009-203356 | | 9/2009 |
| JP | 2009-221027 | | 10/2009 |
| JP | 4598008 | | 12/2010 |
| JP | 2011178634 | * | 9/2011 |
| SU | 517570 | * | 7/1976 |

(Continued)

OTHER PUBLICATIONS

Machine translation JP 200830994, Feb. 2008.*
International Search Report dated Oct. 28, 2014 in International Application No. PCT/JP2014/070200.
International Preliminary Report on Patentability dated Feb. 9, 2016 in International Application No. PCT/JP2014/070200.
Notice of Reasons for Refusal dated Jan. 20, 2017 in corresponding Japanese Application No. 2013-165757, with English translation.
Office Action dated Nov. 20, 2017 in Taiwanese Patent Application No. 103131078, with English-language translation of search report.

*Primary Examiner* — Karl E Group

(74) *Attorney, Agent, or Firm* — Wenderoth, Lind & Ponack, L.L.P.

(57) ABSTRACT

A bismuth-based glass composition includes as a glass composition, in terms of mass %, 55% to 80% of $Bi_2O_3$, 15% to 35% of $SiO_2$, 0% to less than 3% of $ZrO_2$, 0% to 5% of $B_2O_3$, and 0% to less than 8% of ZnO, and has a mass ratio $SiO_2/ZrO_2$ of more than 6.7.

11 Claims, No Drawings

(56) References Cited

FOREIGN PATENT DOCUMENTS

| SU | 541805 | * | 3/1977 |
|---|---|---|---|
| TW | 200722397 | | 6/2007 |
| TW | 200834900 | | 8/2008 |
| TW | 200908200 | | 2/2009 |

* cited by examiner

BISMUTH-BASED GLASS COMPOSITION, POWDER MATERIAL, AND POWDER MATERIAL PASTE

TECHNICAL FIELD

The present invention relates to a bismuth-based glass composition, a powder material, and a powder material paste, and for example, to a bismuth-based glass composition, a powder material, and a powder material paste to be used for formation of an overcoat layer on an electronic circuit or the like.

BACKGROUND ART

An overcoat layer is formed for protection or insulation of an electrode, a resistor body, and the like formed on a soda lime glass substrate, an alumina substrate, or the like. A powder material paste has hitherto been used for formation of the overcoat layer. In general, the powder material paste is a mixture of glass powder and a vehicle, and as required, ceramic powder may be added thereto.

The overcoat layer is formed by applying the powder material paste onto an electrode and the like, followed by firing. In this case, a firing temperature is limited to 600° C. or less in order to prevent a situation in which the characteristics of the electrode and the like deteriorate owing to a reaction between the electrode and the like and a powder material. Therefore, the powder material (powder material paste) is required to be able to be fired at a temperature of 600° C. or less. In addition, the powder material is also required not to cause warpage of a substrate and not to be easily peeled off from the substrate after the firing.

As a powder material satisfying the above-mentioned required characteristics, PbO—$B_2O_3$—$SiO_2$-based glass has hitherto been used (see Patent Literature 1).

In recent years, a reduction in a substance of concern, for example, a reduction in PbO has been promoted from the viewpoint of environmental protection, and various lead-free glasses have been proposed instead of the PbO—$B_2O_3$—$SiO_2$-based glass. For example, in each of Patent Literatures 2 to 4, there is a disclosure of $Bi_2O_3$—$B_2O_3$—ZnO-based glass.

CITATION LIST

Patent Literature 1: JP 58-64245 A
Patent Literature 2: JP 2009-221027 A
Patent Literature 3: JP 2007-63105 A
Patent Literature 4: JP 4598008 B2

SUMMARY OF INVENTION

Technical Problem

Meanwhile, in some cases, plating treatment is performed on an electronic circuit having formed thereon the overcoat layer in order to impart characteristics such as corrosion resistance, optical characteristics, mechanical characteristics, and electrical characteristics. In the plating treatment, the overcoat layer is immersed in a plating solution.

The plating solution is generally an acid solution. Therefore, in the case where the plating treatment is performed, the overcoat layer is required to have acid resistance. That is, the powder material is required to have acid resistance.

However, the $Bi_2O_3$—$B_2O_3$—ZnO-based glass disclosed in each of Patent Literatures 2 to 4 has a problem in that the $Bi_2O_3$—$B_2O_3$—ZnO-based glass is liable to be corroded with the plating solution owing to low acid resistance and its characteristics such as an insulation property is difficult to maintain.

Thus, the present invention has been made in view of the above-mentioned circumstances, and a technical object of the present invention is to devise a bismuth-based glass composition, a powder material, and a powder material paste which can be fired at a temperature of 600° C. or less and are less liable to cause warpage of a substrate and peeling from the substrate without PbO, and are less liable to be corroded with a plating solution.

Solution to Problem

As result of various experiments, the inventors of the present invention have found that the above-mentioned technical object can be achieved by adopting bismuth-based glass as a glass system and restricting the contents of $SiO_2$ and $ZrO_2$ in a glass composition. Thus, the finding is proposed as the present invention. That is, a bismuth-based glass composition according to one embodiment of the present invention comprises as a glass composition, in terms of mass %, 55% to 80% of $Bi_2O_3$, 15% to 35% of $SiO_2$, 0% to less than 3% of $ZrO_2$, 0% to 5% of $B_2O_3$, and 0% to less than 8% of ZnO, and has a mass ratio $SiO_2/ZrO_2$ of more than 6.7.

In general, the bismuth-based glass tends to have low acid resistance. However, in the present invention, the acid resistance is enhanced by restricting the content of $SiO_2$ to 15 mass % or more. The inventors have also found that, in the case where the content of $SiO_2$ is large, an excessively large content of $ZrO_2$ causes precipitation of a zircon (Zr-$SiO_4$) crystal during firing, the crystal reducing the acid resistance, and it becomes difficult to ensure desired acid resistance, while $ZrO_2$ itself is a component which enhances the acid resistance. The inventors have also found that, when the zircon crystal precipitates during melting, a problem of scum or the like, which is liable to be generated in the bismuth-based glass during the melting in the case where the content of $SiO_2$ is large, becomes conspicuous, resulting in a reduction in solubility. In view of the foregoing, in the present invention, the content of $ZrO_2$ is restricted to less than 3 mass % and the mass ratio $SiO_2/ZrO_2$ is restricted to more than 6.7. Thus, the precipitation of the zircon crystal is suppressed, and hence the acid resistance and the solubility are balanced.

It is preferred that the bismuth-based glass composition according to the embodiment of the present invention further comprise 1 mass % to 9 mass % of BaO.

It is preferred that the bismuth-based glass composition according to the embodiment of the present invention further comprise 0.5 mass % to 5 mass % of $Al_2O_3$.

It is preferred that the bismuth-based glass composition according to the embodiment of the present invention have a content of MgO of 5 mass % or less, a content of CaO of 5 mass % or less, a content of SrO of 5 mass % or less, and a content of ZnO of 5 mass % or less.

It is preferred that the bismuth-based glass composition according to the embodiment of the present invention be substantially free of PbO. Herein, the "substantially free of PbO" has a general meaning that mixing of PbO at an impurity level is permitted but positive introduction of PbO is avoided, and specifically refers to the case where the content of PbO in the glass composition is less than 1,000 ppm.

A powder material according to one embodiment of the present invention comprises: glass powder comprising the above-mentioned bismuth-based glass composition; and ceramic powder, wherein a content of the glass powder is from 50 mass % to 100 mass %, and a content of the ceramic powder is from 0 mass % to 50 mass %.

It is preferred that the powder material according to the embodiment of the present invention have a softening point of 600° C. or less.

It is preferred that the powder material according to the embodiment of the present invention be used for formation of an overcoat layer.

A powder material paste according to one embodiment of the present invention comprises: a powder material; and a vehicle, wherein the powder material comprises the above-mentioned powder material.

It is preferred that the powder material paste according to the embodiment of the present invention be substantially free of a phthalic acid-based compound. Herein, the "substantially free of a phthalic acid-based compound" refers to the case where the content of a phthalic acid-based compound in the powder material paste is less than 1,000 ppm.

It is preferred that the powder material paste according to the embodiment of the present invention further comprise one kind or two or more kinds of an adipic acid-based compound, a sebacic acid-based compound, and a citric acid-based compound.

DESCRIPTION OF EMBODIMENTS

A bismuth-based glass composition of the present invention comprises as a glass composition, in terms of mass %, 55% to 80% of $Bi_2O_3$, 15% to 35% of $SiO_2$, 0% to less than 3% of $ZrO_2$, 0% to 5% of $B_2O_3$, and 0% to less than 8% of ZnO, and has a mass ratio $SiO_2/ZrO_2$ of more than 6.7. The reasons why the contents of the components are restricted within the above-mentioned ranges are described below. It should be noted that, in the descriptions of the ranges of the contents of the components, the expression "%" represents "mass %".

$Bi_2O_3$ is a component which reduces a softening point, but is a component which reduces acid resistance. The content of $Bi_2O_3$ is from 55% to 80%, preferably from 57% to 77% or from 60% to 75%, particularly preferably from 65% to 70%. When the content of $Bi_2O_3$ is small, the softening point inappropriately increases, and it becomes difficult to perform firing at a temperature of 600° C. or less. In contrast, when the content of $Bi_2O_3$ is large, the acid resistance is liable to lower, and an overcoat layer is liable to be corroded with a plating solution. As a result, it becomes difficult to ensure protection or insulation of an electrode and the like of an electronic circuit. In addition, material cost rises.

$SiO_2$ is a component which forms a glass skeleton, and is also a component which enhances the acid resistance. The content of $SiO_2$ is from 15% to 35%, preferably from 17% to 33%, particularly preferably from 20% to 30%. When the content of $SiO_2$ is small, the acid resistance is liable to lower, and the overcoat layer is liable to be corroded with the plating solution. As a result, it becomes difficult to ensure protection or insulation of the electrode and the like of the electronic circuit. In contrast, when the content of $SiO_2$ is large, the softening point inappropriately increases, and it becomes difficult to perform the firing at a temperature of 600° C. or less.

$ZrO_2$ is a component which enhances the acid resistance. However, in the case where the content of $SiO_2$ is large as in the present invention, an excessively large content of $ZrO_2$ is liable to cause precipitation of a zircon crystal, and the acid resistance and solubility are liable to lower. Therefore, the content of $ZrO_2$ is less than 3%, preferably less than 2%, particularly preferably less than 1%.

$B_2O_3$ is a component which forms the glass skeleton and further expands a vitrification range, but when the content of $B_2O_3$ is large, there is a risk in that the acid resistance significantly lowers. Therefore, the content of $B_2O_3$ is from 0% to 5%, preferably from 0% to 4% or from 0% to 3.5%, particularly preferably from 0.5% to 3%.

ZnO is a component which reduces the softening point, but is a component which reduces the acid resistance. The content of ZnO is from 0% to less than 8%, preferably from 0% to 5% or from 0% to 4%, particularly preferably from 0% to 3%. When the content of ZnO is large, the acid resistance significantly lowers, and the overcoat layer is liable to be corroded with the plating solution. As a result, it becomes difficult to ensure protection or insulation of the electrode and the like of the electronic circuit.

The mass ratio $SiO_2/ZrO_2$ is more than 6.7, preferably 7 or more, 12 or more, or 18 or more, particularly preferably 25 or more. When the mass ratio $SiO_2/ZrO_2$ is excessively small, the zircon crystal is liable to precipitate, and the acid resistance and the solubility are liable to lower.

In addition to the above-mentioned components, for example, the following components may be introduced.

BaO is a component which reduces the softening point, and is also a component which stabilizes glass, in particular, suppresses phase separation. The content of BaO is preferably from 0% to 9%, from 1% to 9%, or from 2% to 8%, particularly preferably from 3% to 7%. When the content of BaO is small, the glass is liable to be unstable. In contrast, when the content of BaO is large, the acid resistance is liable to lower, and the overcoat layer is liable to be corroded with the plating solution. As a result, it becomes difficult to ensure protection or insulation of the electrode and the like of the electronic circuit.

$Al_2O_3$ is a component which enhances the acid resistance, and is also a component which stabilizes the glass, in particular, suppresses the phase separation. The content of $Al_2O_3$ is preferably from 0% to 5%, from 0.5% to 5%, or from 0.5% to 3%, particularly preferably from 0.5% to 2.5%. When the content of $Al_2O_3$ is small, the glass is liable to be unstable. In contrast, when the content of $Al_2O_3$ is large, the softening point inappropriately increases, and it becomes difficult to perform the firing at a temperature of 600° C. or less.

MgO is a component which reduces the softening point, and is also a component which stabilizes glass. The content of MgO is preferably from 0% to 5% or from 0% to 4%, particularly preferably from 0% to 3%. When the content of MgO is large, the acid resistance is liable to lower, and the overcoat layer is liable to be corroded with the plating solution. As a result, it becomes difficult to ensure protection or insulation of the electrode and the like of the electronic circuit.

CaO is a component which reduces the softening point, and is also a component which stabilizes glass. The content of CaO is preferably from 0% to 5% or from 0% to 4%, particularly preferably from 0% to 3%. When the content of Ca0 is large, the acid resistance is liable to lower, and the overcoat layer is liable to be corroded with the plating solution. As a result, it becomes difficult to ensure protection or insulation of the electrode and the like of the electronic circuit.

SrO is a component which reduces the softening point, and is also a component which stabilizes glass. The content of SrO is preferably from 0% to 5% or from 0% to 4%, particularly preferably from 0% to 3%. When the content of SrO is large, the acid resistance is liable to lower, and the overcoat layer is liable to be corroded with the plating solution. As a result, it becomes difficult to ensure protection or insulation of the electrode and the like of the electronic circuit.

Various components other than the above-mentioned components may be introduced within a range not impairing the required characteristics. For example, in order to reduce the softening point, $Cs_2O$, $Rb_2O$, and the like may be introduced in combination or alone in an amount of up to 5%, particularly up to 1% in terms of a total content. In addition, in order to stabilize the glass or enhance water resistance and the acid resistance, $Y_2O_3$, $La_2O_3$, $Ta_2O_5$, $SnO_2$, $TiO_2$, $Nb_2O_5$, $P_2O_5$, CuO, $CeO_2$, $V_2O_5$ and the like may be introduced in combination or alone in an amount of up to 10%, particularly up to 1% in terms of a total content.

In addition, PbO is a component which reduces the softening point, but is also a substance of concern. Therefore, it is preferred to avoid substantial introduction of PbO.

A powder material of the present invention comprises: glass powder formed of the above-mentioned bismuth-based glass composition; and ceramic powder, wherein the content of the glass powder is from 50 mass % to 100 mass %, and the content of the ceramic powder is from 0 mass % to 50 mass %.

The glass powder may be produced by, for example, forming molten glass into a film shape, and then pulverizing and classifying the resultant glass film.

The glass powder preferably has an average particle diameter $D_{50}$ of 3.0 µm or less and a maximum particle diameter $D_{max}$ of 20 µm or less. When the particle size of the glass powder is too large, large bubbles are liable to remain in a fired coating. Herein, the "average particle diameter $D_{50}$" refers to a value obtained through measurement with a laser diffractometer, and represents, in a cumulative particle size distribution curve on a volume basis obtained through measurement by laser diffractometry, a particle diameter at which the integration amount of particles from a smaller particle side is 50% in a cumulative manner. The "maximum particle diameter $D_{max}$" refers to a value obtained through measurement with a laser diffractometer, and represents, in a cumulative particle size distribution curve on a volume basis obtained through measurement by laser diffractometry, a particle diameter at which the integration amount of particles from a smaller particle side is 99% in a cumulative manner.

The content of the ceramic powder is preferably 40 vol % or less, 30 vol % or less, 20 vol % or less, 10 vol % or less, or 5 vol % or less, particularly preferably less than 1 vol %. When the content of the ceramic powder is too large, the ratio of the glass powder is relatively too small, and hence it becomes difficult to form a dense overcoat layer, and the overcoat layer is liable to be corroded with the plating solution. As a result, it becomes difficult to ensure protection or insulation of an electrode and the like of an electronic circuit. It should be noted that the thermal expansion coefficient, mechanical strength, and acid resistance of the powder material can be adjusted through the addition of the ceramic powder.

Various materials may be used as the ceramic powder, and for example, one kind or two or more kinds of alumina, zircon, zirconia, mullite, silica, cordierite, titania, tin oxide, and the like may be added.

The powder material of the present invention has a softening point of preferably 600° C. or less, particularly preferably 595° C. or less. When the softening point is too high, it is necessary to increase a firing temperature in order to obtain a dense overcoat layer. In this case, the characteristics of the electrode and the like are liable to deteriorate owing to a reaction between the electrode and the like and the powder material. Herein, the "softening point" refers to a value at the fourth inflection point obtained through measurement with a macro-type differential thermal analyzer (DTA).

The powder material of the present invention has a thermal expansion coefficient of preferably from $65 \times 10^{-7}$/° C. to $85 \times 10^{-7}$/° C., particularly preferably from $72 \times 10^{-7}$/° C. to $80 \times 10^{-7}$/° C. With this, after formation of the overcoat layer on a soda lime glass substrate or an alumina substrate, warpage of the substrate and peeling of the overcoat layer are easily prevented. Herein, the "thermal expansion coefficient" refers to a value obtained through measurement with a thermomechanical analyzer (TMA) in a temperature range of from 30° C. to 300° C.

A powder material paste of the present invention comprises a powder material and a vehicle, wherein the powder material is the above-mentioned powder material. Herein, the vehicle is a material for dispersing the glass powder therein to form a paste, and is generally formed of a thermoplastic resin, a plasticizer, a solvent, and the like.

The powder material paste may be produced by preparing the powder material and the vehicle, and mixing and kneading those materials at a predetermined ratio.

The thermoplastic resin is a component which increases the strength of a dried coating, and is also a component which imparts flexibility. The content of the thermoplastic resin in the powder material paste is preferably from 0.1 mass % to 20 mass %. Preferred examples of the thermoplastic resin include polybutyl (meth)acrylate, polyvinyl butyral, polymethyl (meth)acrylate, polyethyl (meth)acrylate, and ethyl cellulose. It is preferred to use one kind or two or more kinds thereof.

The plasticizer is a component which controls a drying speed and imparts the flexibility to the dried coating. The content of the plasticizer in the powder material paste is preferably from 0 mass % to 10 mass %, particularly preferably from 0.1 mass % to 10 mass %. As the plasticizer, it is preferred that the powder material paste be substantially free of a phthalic acid-based compound, such as butyl benzyl phthalate, dioctyl phthalate, diisooctyl phthalate, dicapryl phthalate, or dibutyl phthalate. With this, an environmental load can be reduced. From the environmental viewpoint, preferred examples of the plasticizer include: an adipic acid-based compound, such as diisobutyl adipate or dibutoxyethyl adipate; a sebacic acid-based compound, such as dibutyl sebacate or di(2-ethylhexyl) sebacate; and a citric acid-based compound, such as acetyl tributyl citrate. It is preferred to use one kind or two or more kinds thereof.

The solvent is a component which dissolves the thermoplastic resin. The content of the solvent in the powder material paste is preferably from 10 mass % to 30 mass %. Preferred examples of the solvent include terpineol, diethylene glycol monobutyl ether acetate, and 2,2,4-trimethyl-1,3-pentanediol monoisobutyrate. It is preferred to use one kind or two or more kinds thereof.

When an overcoat layer is formed on an electronic circuit by using the powder material paste, first, the powder material paste is applied onto the electronic circuit in which an electrode, a resistor body, and the like are formed, by a screen printing method, a batch coating method, or the like, to form an applied layer having a predetermined thickness. Then, the applied layer is dried to yield a dried coating. After that, the dried coating is fired at a temperature of from 500° C. to 600° C. for from 5 minutes to 20 minutes. Thus, a predetermined overcoat layer (fired coating) can be formed. It should be noted that, when the firing temperature is too low or the firing time period (retention time period) is too short, the dried coating is not sufficiently sintered, and it becomes difficult to form a dense fired coating. In contrast, when the firing temperature is too high or the retention time period is too long, the characteristics of the electrode and the like are liable to deteriorate owing to a reaction between the electrode and the like and the powder material.

As a method of forming an overcoat layer, the method involving using the powder material paste has been described as an example. However, a method other than the method may be adopted. For example, a method such as a green sheet method, a photosensitive paste method, or a photosensitive green sheet method may be adopted.

The bismuth-based glass composition, powder material, and powder material paste of the present invention are preferably used for formation of an overcoat layer in a chip resistor. In the chip resistor, an electrode, a resistor body, and the like are formed on an alumina substrate, and an overcoat layer is formed thereon. In addition, after the formation of the overcoat layer, plating treatment with a plating solution is performed. As described above, the bismuth-based glass composition, powder material, and powder material paste of the present invention can be fired at a temperature of 600° C. or less and are less liable to cause warpage of the substrate or peeling from the substrate without PbO, and are less liable to be corroded with the plating solution, and hence are particularly suitable for this application.

EXAMPLES

Now, the present invention is described in detail by way of Examples. It should be noted that the present invention is by no means limited to the following Examples. The following Examples are merely illustrative.

Examples of the present invention (Sample Nos. 1 to 11) and Comparative Example (Sample No. 12) are shown in Tables 1 and 2.

TABLE 1

| Glass composition | Example | | | | | |
|---|---|---|---|---|---|---|
| (mass %) | No. 1 | No. 2 | No. 3 | No. 4 | No. 5 | No. 6 |
| $Bi_2O_3$ | 68.5 | 68.5 | 68.0 | 67.5 | 68.5 | 67.5 |
| $SiO_2$ | 23.0 | 23.0 | 22.2 | 24.0 | 23.5 | 23.5 |
| BaO | 5.0 | 4.0 | 5.5 | 3.5 | 2.5 | 4.0 |
| $Al_2O_3$ | 1.5 | 1.4 | 1.0 | 0.5 | 1.5 | 1.0 |
| $ZrO_2$ | 0.5 | 0.1 | 0.8 | | | 0.5 |
| $B_2O_3$ | 1.5 | 3.0 | 2.5 | 3.0 | 1.5 | 2.5 |
| MgO | | | | | | |
| CaO | | | | | | 1.0 |
| SrO | | | | 1.5 | | |
| ZnO | | | | | 2.5 | |
| $TiO_2$ | | | | | | |
| $SiO_2/ZrO_2$ | 46 | 230 | 28 | ∞ | ∞ | 47 |
| Solubility | ○ | ○ | ○ | ○ | ○ | ○ |
| Softening point (° C.) | 590 | 594 | 588 | 595 | 584 | 589 |
| Thermal expansion coefficient ($\times 10^{-7}$/° C.) | 76 | 75 | 77 | 76 | 78 | 79 |
| Acid resistance (%) | 0.02 | 0.04 | 0.03 | 0.02 | 0.03 | 0.04 |

TABLE 2

| Glass composition | Example | | | | | Comparative Example |
|---|---|---|---|---|---|---|
| (mass %) | No. 7 | No. 8 | No. 9 | No. 10 | No. 11 | No. 12 |
| $Bi_2O_3$ | 66.0 | 69.0 | 68.0 | 63.5 | 68.5 | 67.5 |
| $SiO_2$ | 22.5 | 23.0 | 22.0 | 30.0 | 22.5 | 21.0 |
| BaO | 6.5 | 2.5 | 5.5 | | 6.0 | 4.0 |
| $Al_2O_3$ | 1.0 | 1.5 | 0.5 | 1.5 | | 0.5 |
| $ZrO_2$ | 0.8 | 0.5 | 0.7 | 0.5 | 0.5 | 5.0 |
| $B_2O_3$ | 3.0 | 1.0 | 1.3 | 2.0 | 2.5 | 2.0 |
| MgO | 0.2 | | | | | |
| CaO | | | | | | |
| SrO | | | | | | |
| ZnO | | 1.5 | | | | |
| $TiO_2$ | | | 2.0 | 2.5 | | |
| $SiO_2/ZrO_2$ | 28 | 46 | 31 | 60 | 46 | 4.2 |
| Solubility | ○ | ○ | ○ | Δ | Δ | x |
| Softening point (° C.) | 597 | 590 | 586 | 602 | 572 | 582 |
| Thermal expansion coefficient ($\times 10^{-7}$/° C.) | 76 | 77 | 79 | 76 | 82 | 80 |
| Acid resistance (%) | 0.07 | 0.03 | 0.02 | 0.43 | 0.23 | 0.09 |

Each sample was prepared as described below. First, raw materials were blended so as to give a glass composition shown in Table 1 or 2, and were homogeneously mixed. Next, the mixture was loaded in a platinum crucible and melted at from 1,250° C. to 1,350° C. for 2 hours, and then formed into a film shape. The resultant glass film was used to be evaluated for solubility. The case where a devitrified crystal and phase separation were not observed on the surface of the glass film was evaluated as "○", the case where a devitrified crystal or phase separation was slightly observed on the surface of the glass film was evaluated as "Δ", and the case where stones or phase separation was remarkably observed on the surface of the glass film was evaluated as "x".

Next, the glass film was pulverized with a ball mill, and then classified with air flow, to yield glass powder having an average particle diameter $D_{50}$ of 3.0 μm or less and a maximum particle diameter $D_{max}$ of 20 μm or less. The resultant glass powder was used to be evaluated for a softening point and a thermal expansion coefficient.

The softening point was a value at the fourth inflection point obtained through measurement with a macro-type differential thermal analyzer (DTA).

The thermal expansion coefficient is a value obtained through measurement of a measurement sample with a thermomechanical analyzer (TMA) in a temperature range of from 30° C. to 300° C., the measurement sample being obtained by pressure forming each glass powder and firing the resultant at (softening point+10) ° C., followed by processing into a diameter of 5 mm and a length of 20 mm.

Next, each glass powder and a vehicle (terpineol containing 5 mass % of ethyl cellulose and 3 mass % of acetyl tributyl citrate) were mixed and kneaded with a three-roll mill, to yield a powder material paste. Further, the powder material paste was applied onto an alumina substrate by a screen printing method, and the applied coating was dried and then fired in an electric furnace at a temperature of (softening point+10) ° C. for 10 minutes, so as to yield a fired coating (overcoat layer) having a thickness of about 10 μm. Thus, the fired coating was formed. The substrate with the fired coating thus obtained was used to be evaluated for acid resistance. Specifically, the substrate with the fired coating was immersed in 5 mass % sulfuric acid at 40° C. for 1 hour, followed by washing with water and drying. After that, a mass reduction was measured, and a mass reduction ratio before and after the immersion was evaluated. It should be noted that a larger mass reduction ratio means lower acid resistance.

As is apparent from Tables 1 and 2, in each of Sample Nos. 1 to 9, the softening point was low, and the solubility and the acid resistance were good. In Sample No. 10, a phase separation tendency was slightly observed, and hence the solubility and the acid resistance were reduced to that extent. Also in Sample No. 11, a phase separation tendency was slightly observed, and hence the solubility and the acid resistance were reduced to that extent. In Sample No. 12, the solubility was poor.

INDUSTRIAL APPLICABILITY

The bismuth-based glass composition, powder material, and powder material paste of the present invention are suitable for formation of an overcoat layer, particularly suitable for formation of an overcoat layer in a chip resistor. However, other than the applications, the bismuth-based glass composition, powder material, and powder material paste of the present invention may be applied to, for example, an application such as a binder for an electronic component material or a material for sealing.

The invention claimed is:

1. A bismuth-based glass composition, comprising as a glass composition, in terms of mass %, 60% to 80% of $Bi_2O_3$, 15% to 35% of $SiO_2$, 0.1% to less than 1% of $ZrO_2$, 0% to 3% of $B_2O_3$, and 0% to less than 8% of ZnO, and having a mass ratio $SiO_2/ZrO_2$ of greater than 15.

2. The bismuth-based glass composition according to claim 1, further comprising 1 mass % to 9 mass % of BaO.

3. The bismuth-based glass composition according to claim 1, further comprising 0.5 mass % to 5 mass % of $Al_2O_3$.

4. The bismuth-based glass composition according to claim 1, wherein the bismuth-based glass composition has a content of MgO of 5 mass % or less, a content of CaO of 5 mass % or less, a content of SrO of 5 mass % or less, and a content of ZnO of 5 mass % or less.

5. The bismuth-based glass composition according to claim 1, wherein the bismuth-based glass composition is substantially free of PbO.

6. A powder material, comprising:
a glass powder comprising the bismuth-based glass composition of claim 1; and
a ceramic powder,
wherein a content of the glass powder is from 50 mass % to 100 mass %, and a content of the ceramic powder is from 0 mass % to 50 mass %.

7. The powder material according to claim 6, wherein the powder material has a softening point of 600° C. or less.

8. The powder material according to claim 6, wherein the powder material is used for formation of an overcoat layer.

9. A powder material paste, comprising:
a powder material; and
a vehicle,
wherein the powder material comprises the powder material of claim 6.

10. The powder material paste according to claim 9, wherein the powder material paste is substantially free of a phthalic acid-based compound.

11. The powder material paste according to claim 9, further comprising at least one compound selected from the group consisting of an adipic acid-based compound, a sebacic acid-based compound, and a citric acid-based compound.

* * * * *